US012809602B1

(12) United States Patent
Cheng

(10) Patent No.: US 12,809,602 B1
(45) Date of Patent: Nov. 24, 2026

(54) CODING STRUCTURE FOR APPLICATION DEVELOPMENT

(71) Applicant: Zoom Communications, Inc., San Jose, CA (US)

(72) Inventor: Wanpeng Cheng, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 245 days.

(21) Appl. No.: 18/758,714

(22) Filed: Jun. 28, 2024

(51) Int. Cl.
*G06F 8/41* (2018.01)
*G06F 8/34* (2018.01)
*G06F 8/38* (2018.01)

(52) U.S. Cl.
CPC .................. *G06F 8/44* (2013.01); *G06F 8/34* (2013.01); *G06F 8/38* (2013.01)

(58) Field of Classification Search
None
See application file for complete search history.

(56) References Cited

U.S. PATENT DOCUMENTS 8,645,973 B2 * 2/2014 Bosworth ............... H04L 67/10 719/320
9,344,833 B2 * 5/2016 Nyisztor ................... G06F 8/71
9,851,953 B2 12/2017 Straub et al.
9,851,968 B2 12/2017 Straub
2012/0180073 A1 * 7/2012 Hung .................. G06F 16/9566 715/234
2014/0229849 A1 * 8/2014 Singh ...................... G06F 9/461 715/745
2015/0160987 A1 * 6/2015 Knichel .................. G06F 9/451 719/318

OTHER PUBLICATIONS

TopCoder, Introduction To Activities In Android, <https://www.topcoder.com/thrive/articles/introduction-to-activities-in-android#:~: text=An%20activity%20in%20Android%20is,happening%2C%20design%20files%2C%20etc,> Ubaid Ahmed, retrieved from internet Jun. 28, 2024, 11 pages.
Developers, Guide to app architecture, <https://developer.android.com/topic/architecture,> Jul. 12, 2023, 12 pages.
Developers, Introduction to activities, <https://developer.android.com/guide/components/activities/intro-activities,> retrieved from internet Jun. 28, 2024, 7 pages.

* cited by examiner

*Primary Examiner* — Ari Shahabi
(74) *Attorney, Agent, or Firm* — Young Basile Hanlon & MacFarlane, P.C.

(57) ABSTRACT

A software development platform provides one or more layers within an activity structure of a development environment for developing a mobile application. A layer includes a compose page entity associated with a user interface (UI) page of the mobile application and a compose controller entity corresponding to the compose page entity. The compose page entity includes a first coding interface for receiving a set of UI program components associated with the UI page, and the compose controller entity includes a second coding interface for receiving a set of non-UI program components associated with the UI page. The first coding interface receives user input including at least some of the set of UI program components. The second coding interface receives user input including at least some of the set of non-UI program components. The software development platform generates the mobile application based on the received user input and the one or more layers.

20 Claims, 11 Drawing Sheets

CODING STRUCTURE FOR APPLICATION DEVELOPMENT

FIELD

This disclosure generally relates to video conferencing, and more particularly to software development of video conferencing applications.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
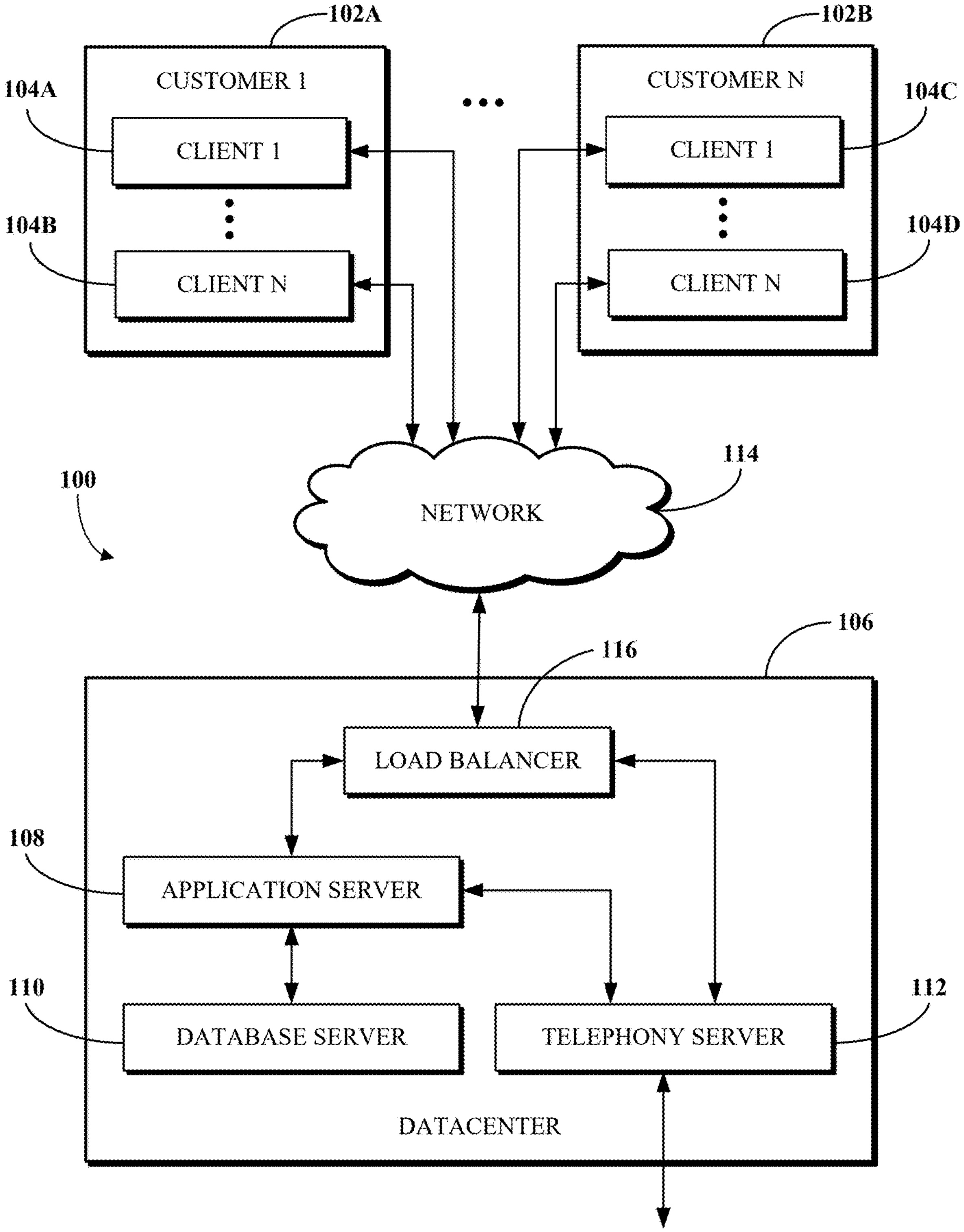
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conferencing software may be developed for mobile devices such as smartphones and tablets. In developing a mobile application for video conferencing, a developer may focus on various aspects including, but not limited to, implementing video and audio streaming capabilities, optimizing network bandwidth usage, ensuring low-latency communication, integrating user authentication and authorization procedures, and incorporating screen sharing functionalities. Additional considerations may include designing user-friendly interfaces, enabling end-to-end encryption for secure communication, and ensuring compatibility with multiple operating systems and devices. Developers may also implement features such as recording sessions, managing participant permissions, and providing real-time feedback and control options for moderators.

To develop mobile conferencing software, a developer may work within a software development environment configured for mobile application development. For example, to develop an application for an Android operating system, a software developer may use a software development environment provided specifically for Android development, such as Android Studio, a widely used integrated development environment (IDE) for Android application (referred to interchangeably as "app") creation. Android Studio organizes a project, encapsulating source code, assets, test code, and build configurations necessary for application development. Within the project, modules partition the functionality into discrete units that can be independently built, tested, and debugged. This modular approach aids in managing code libraries and facilitates development for various device types such as phones, wearables, and automotive systems.

Current methodologies of app development divide the project into distinct types of modules: Android app modules, feature modules, and library modules. Android app modules serve as containers for the app's source code and resource files, segmented further depending on the target devices such as televisions, automobiles, and Wear OS-based devices. Feature modules leverage Play Feature Delivery to deliver app features on demand, enhancing user experiences by providing certain features as needed or via Google Play Instant. Library modules, containing reusable code like Java or Kotlin libraries, are non-installable archives deployed as dependencies in multiple app modules, expanding code sharing capabilities.

Despite these structured components, existing development technologies have several limitations. One prevalent issue is the disjointed visibility of project files in the Android Studio's default view, which simplifies navigation but obscures actual file hierarchy and critical configuration files such as build scripts and alternative resource files. Consequently, developers may find it challenging to manage complex build configurations, especially when dealing with extensive modular projects. Navigating between different build types and product flavors further adds to the complexity, highlighting a need for seamless access and visibility into the complete project structure.

Moreover, the dependency declaration process in current systems, especially when integrating library modules into app modules, demands meticulous attention. Incorrect configurations may lead to build failures or runtime issues, impeding efficient development workflows. The challenge extends to managing dependencies and version control when using multiple libraries across various modules, as existing solutions lack a cohesive approach to maintaining consistency and integration across project components.

Implementations of this disclosure address problems such as these using a system that enhances the management and visibility of project structures and dependencies within Android Studio. The system may be used to provide a comprehensive view of the project hierarchy, facilitating access to all configuration files and resources. The system may offer streamlined processes for managing dependencies and build configurations, alleviating the complexities associated with multi-module projects. These enhancements may enable more efficient and error-free app development. While much of the description herein is presented in the context of developing mobile applications for the Android operating system, various implementations may be used for development of applications for Android operating systems installed on non-mobile devices.

In developing an Android application for a video conferencing platform, a software developer typically follows a systematic methodology encompassing several stages. Initially, the developer sets up the development environment, which includes installing Android Studio and the Android Software Development Kit (SDK). The developer then creates a new project in Android Studio, configuring the project settings such as the application name, package name, and target Android device versions. The project structure generally includes essential components such as activities, fragments, and services. The developer implements user interface (UI) program components using XML layouts and incorporates necessary permissions in the AndroidManifest.xml file to access hardware features like the camera and microphone. UI program components are software components (e.g., source code, function calls, etc.) of an application that cause a processor that implements the application to present UI elements. UI elements may include any number of aspects of a UI such as, for example, representations presented in the UI, selectable representations that can be clicked and/or otherwise selected by a user of the computing device that presents the UI, input fields of a UI, and/or icons, among other examples.

Subsequently, the developer integrates a real-time communication library or SDK, such as WebRTC, to facilitate video and audio streaming. This integration involves adding the library dependencies to the project's build.gradle file and configuring the necessary initialization parameters. The developer then implements the core functionality, which includes establishing a connection to a signaling server, handling Session Initiation Protocol (SIP) or WebSocket communications and managing peer-to-peer (P2P) connections. The UI program components are configured to handle user interactions for initiating, joining, and leaving video conferences. The developer also ensures the application manages various states and events such as network disruptions, user authentication, and session termination. Finally, testing is performed to ensure compatibility across different Android devices and operating system versions, followed by deployment through the Google Play Store or other distribution channels.

On Android platforms, the "Activity" functions as a primary component responsible for presenting a UI to end-users. An application may encompass multiple Activities, each representing a distinct functional unit. For instance, in video conferencing applications, a screen (which may be rendered using a software code entity referred to as a "page") displaying other participants' videos can be encapsulated within an Activity, addressing the function of displaying video streams. When a user interacts, such as clicking a button labeled "participants," the application may present another screen to show all participants' details, such as names, emails, and avatars. This additional screen can manifest as another Activity, focused on the function of managing participants. As an app increases in complexity, it may consist of numerous Activities to fulfill its various functions. This proliferation of Activities can strain system resources, complicate navigation, and impede data sharing.

To address the challenges posed by multiple activities, developers often adopt the single-activity structure. In this approach, an application comprises only one Activity serving as the primary display component. Developers encapsulate their functionalities into smaller display units, swapping them out as needed to switch between functions. This arrangement is more resource-efficient for the operating system and facilitates communication and data exchange.

There are two official methods for organizing these display units: "Fragments" and "Compose Functions." Fragments are comparable to lightweight Activities and help alleviate system burden, but they may not necessarily simplify coding complexity for developers. In contrast, Compose Functions offer advantages in modern development, as they reduce both system burden and coding complexity. However, developers need to exercise caution when using them, as improper implementation may lead to issues such as user interface overlapping and disorganized control logic.

To aid developers in encapsulating their functionalities, the present disclosure provides a software development entity referred to as a compose page entity (referred to interchangeably as a "Compose Page," although any other name for an entity providing the functionalities described herein may be used). A compose page entity is a coding structure that leverages the Android system's "Compose API" entity and defines several state callbacks such as, for example, "OnAddToScreen( )" to provide a starting point for developers to execute specific actions. A compose page entity may serve as a pure display structure, containing logic solely for rendering UIs on the screen, such as defining button borders, colors, and/or transparency, among other examples. In addition to controlling the appearance of UIs, an additional software development entity may be used to control the aspects of the UI (which may be conceptualized as "what to draw") and the invocation of them (which may be conceptualized as "when to draw"). This entity may be referred to as a compose controller (referred to interchangeably as a "Compose Controller," although any other name for an entity providing the functionalities described herein may be used). Each compose page entity may be accompanied by a compose controller. A compose controller is a coding structure that may be responsible for handling all non-UI logic, including tasks such as loading data from data sources, listening to callbacks from external systems, responding to user inputs, and/or adjusting UI elements on the corresponding compose page entity, among other examples.

The compose page entity and compose controller entity are provided in a system that adopts the single-activity paradigm to ensure code isolation across different features and enhance maintainability. To achieve this paradigm, the system may include layers. Within an Activity, multiple layers may be defined, each occupying the entire display area of the Activity. Layers may be distinguished by internal indexes, where elements in layers with higher indexes can overlay those in layers with lower indexes. By strategically assigning feature pages to appropriate layers, some aspects of the present disclosure may mitigate the risks of code interference and element overlapping, thus fostering a more organized and manageable app architecture.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for software development of mobile video conferencing applications. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
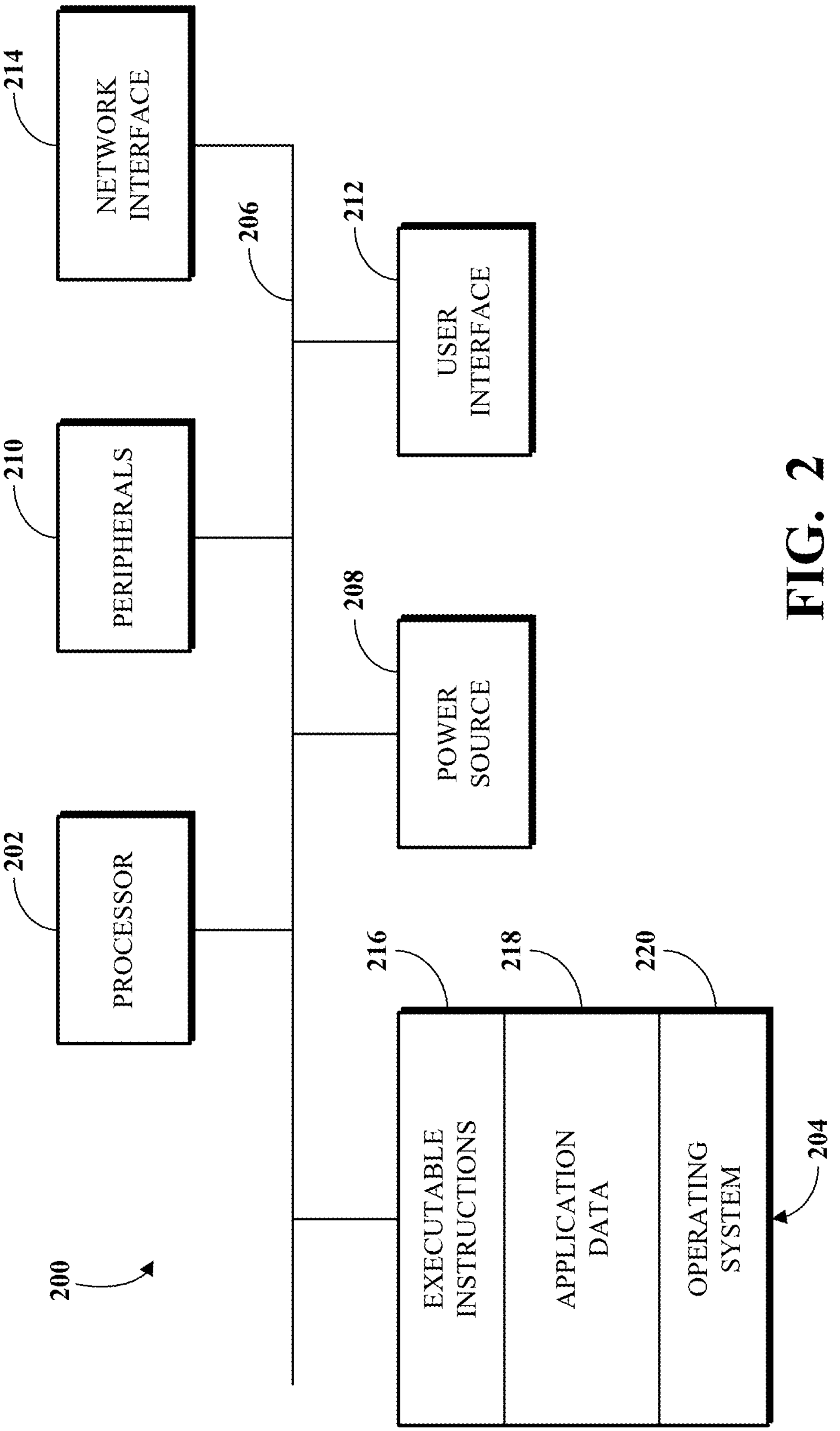
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
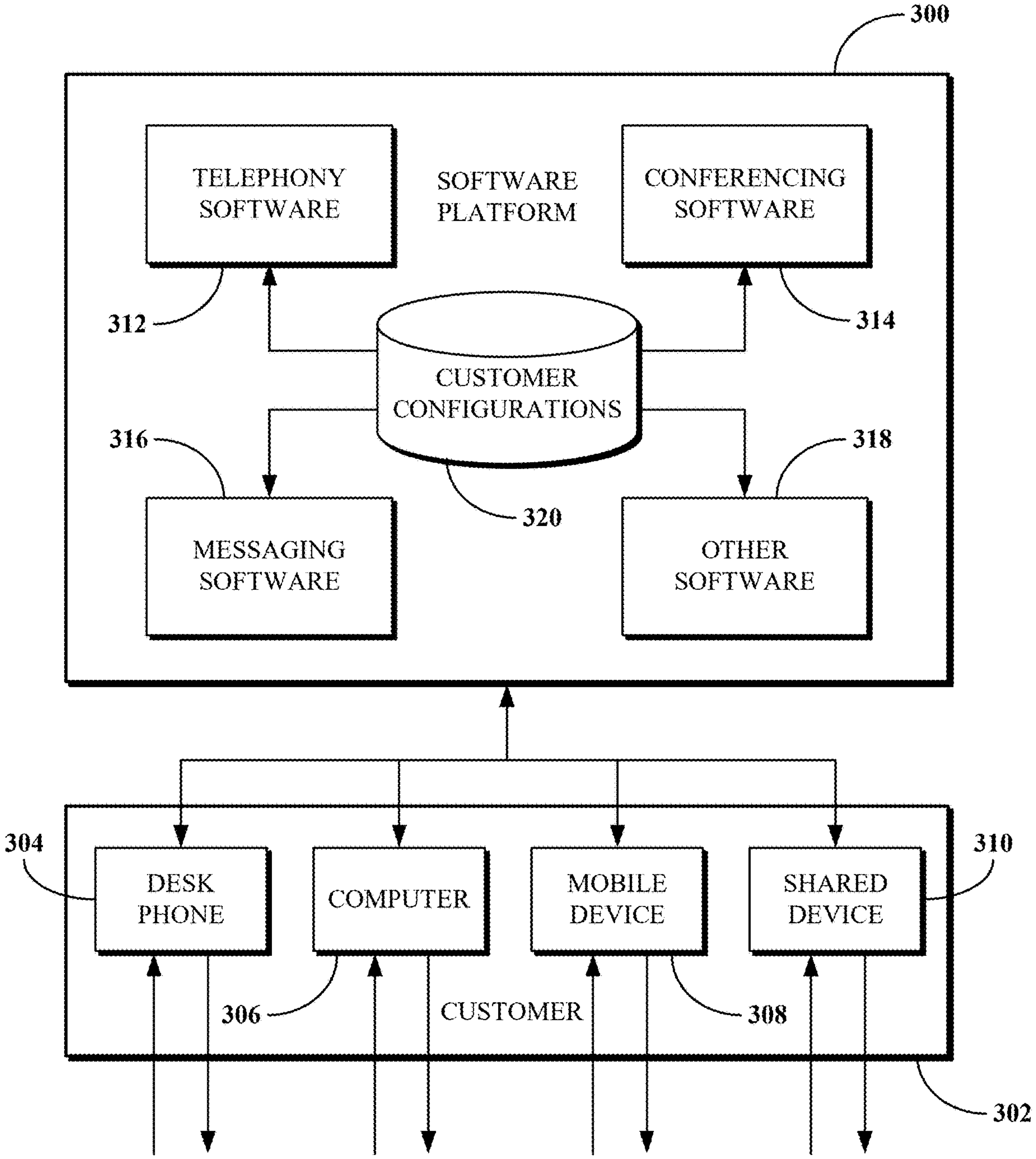
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software associated with a development environment for developing a mobile application, as described herein.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
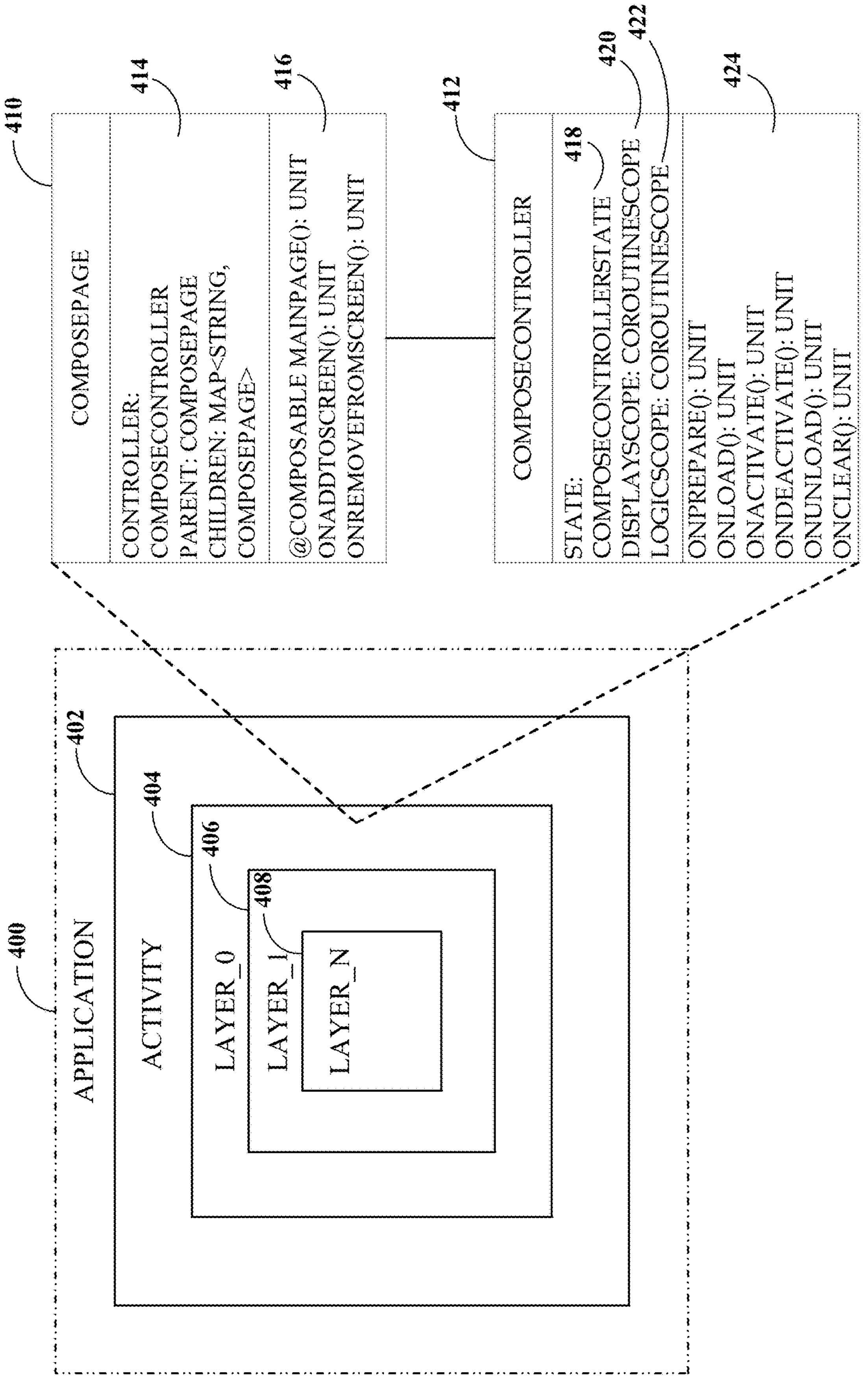
FIG. 4 is a block diagram showing an architecture of a mobile application being developed within a mobile application software development environment.

FIG. 4 is a block diagram showing an architecture of a mobile application 400 (shown as "application") being developed within a mobile application software development environment. The mobile application software development environment may include, for example, Android Studio and may incorporate the Android SDK. FIG. 4 depicts a hierarchical structure within the software development environment for developing the mobile application, illustrating the relationship between several layers within an Activity and their associated elements. The Activity 402 is structured hierarchically with a first layer 404 (shown as "layer_0"), a second layer 406 (shown as "layer_1"), and a third layer 408 (shown as "layer_N"), consistent with a development environment for mobile applications. Each layer within the activity 402 represents a distinct level within the application development framework. In various implementations, an Activity 402 may include any number of layers.

As shown, the first layer 404 may include a compose page entity 410 and a corresponding compose controller entity 412. In some implementations, each layer may include a corresponding compose page entity 412. The compose page entity 410 corresponds to a UI page within these layers. The compose page entity manages the UI logic. The compose controller entity 412 manages the non-UI logic and ensures the UI behaves as expected. The compose page entity 410 is further characterized by a set 414 of attributes, which includes a controller attribute pointing to the compose controller entity 412, parent page attribute indicating a parent page, and a child page attribute indicating one or more child pages. The compose page entity 410 also may include a set 416 of functions, which are invoked during UI transitions such as onAddToScreen( ) and onRemoveFromScreen( ).

The compose controller entity 412 maintains various states of the UI through a state attribute 418 and operates within two coroutine scopes: a display scope 420 and a logic scope 422. The display scope 420 runs jobs identical to the lifecycle of the displaying page, while the logic scope 422 handles jobs matching the lifecycle of the controlling logic, ensuring continuous operation during transitions such as screen rotations or language changes.

Furthermore, the compose controller entity 412 defines a set 424 of state callbacks. The set 424 of state callbacks may include, for example, an onPrepare( ) state callback, an onLoad( ) state callback, an onActivate( ) state callback, an onDeactivate( ) state callback, an onUnload( ) state callback, and an onClear( ) state callback. These state callbacks manage the initialization, data loading, activation, deactivation, data release, and final cleanup of resources, ensuring the effective management of the page's lifecycle. For example, the compose controller entity 412 may execute the onPrepare( ) callback to initialize the necessary resources prior to data loading, including memory allocation and initial setup of state variables. The compose controller entity 412 may utilize the onLoad( ) callback to load data from one or more sources, which may include databases, external APIs, or local storage, among other examples, thereby making the data available for subsequent operations.

The compose controller entity 412 may invoke the onActivate( ) callback to initiate processes or services that need to be operational during active page usage, such as starting timers, animations, or network listeners. The compose controller entity 412 may call the onDeactivate( ) callback to temporarily halt or pause ongoing processes without releasing allocated resources. This may include stopping timers, pausing animations, or suspending network listeners. The compose controller entity 412 may apply the onUnload( ) callback to release data that is no longer required, which may involve closing database connections, clearing cached data, and disposing of temporary objects. The compose controller entity 412 may engage the onClear( ) callback to perform the final cleanup of resources, including deallocating memory, resetting state variables, and ensuring that any remaining processes or services are properly terminated. This layered structure may allow for isolated management of features within an Activity 402, facilitating ease of maintenance and extension while reducing the likelihood of code interference or UI overlap issues.

Figure 5:
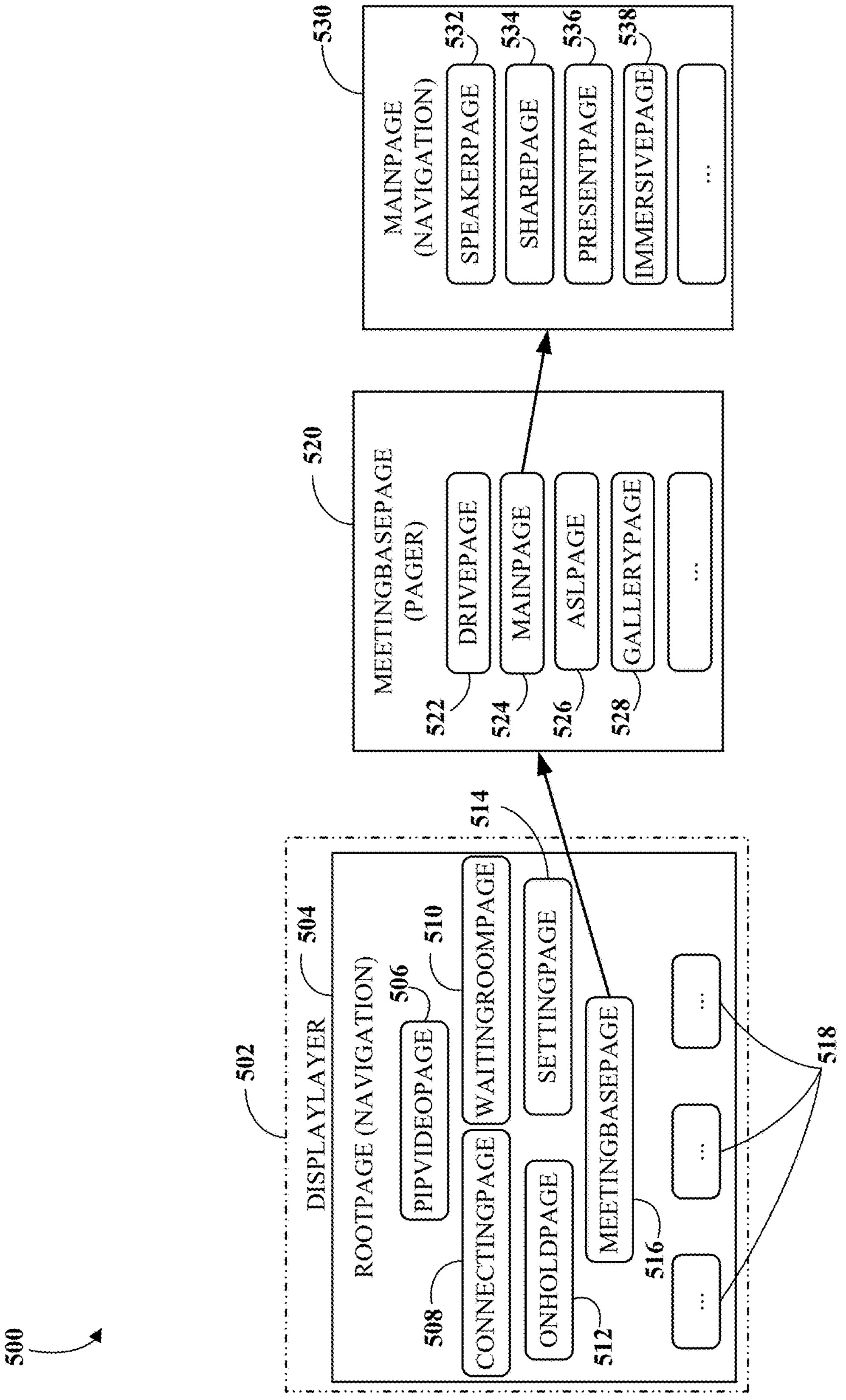
FIG. 5 is a block diagram showing an example architecture of a display layer in a video conferencing application structure.

FIG. 5 is a block diagram showing an example architecture 500 of a display layer 502 in a video conferencing application structure. For example, the video conferencing application structure may be, include, or be included in, the mobile application 400 shown in FIG. 4. The display layer 502 includes a parent page 504 (shown as "root page (navigation)"), within which various child pages are organized. For example, the parent page 504 may include a picture-in-picture (PIP) page representation 506, a connecting page representation 508, a waiting room page representation 510, an on-hold page representation 512, and a setting page representation 514. Multiple additional page representations 518 are depicted, which indicate the potential for more pages dedicated to specific tasks or features without cluttering the main navigation. Each representation 506, 508, 510, 512, and 514 may be a selectable representation that, in response to interaction therewith, is configured to open the corresponding page. The pages may be designed to host different functionalities and screens that a user may encounter during a video conferencing session. The pages to which the page representations 506, 508, 510, 512, and 514 are directed may be referred to as "sub-pages" (in this case, sub-pages of the parent page 504).

For example, upon selection, by a developer, of the meeting base page representation 516, the computing device on which the developer is working may be caused to display a meeting base page 520. The meeting base page 520 may serve as a focal point within the display layer 502 for meeting-related functionalities. The meeting base page 520 may include several page representations, such as a drive page representation 522, a main page representation 524, an American Sign Language (ASL) page representation 526, and a gallery page representation 528. The meeting base page 520 may include any number of other page representations. The sub-pages associated with the page representations 520, 522, 524, 526, and 528 relate to the mobile applications ability to cater to diverse user needs within the meeting environment, such as accessing documents (e.g., via a drive page), returning to the main meeting interface (e.g., via the main page 530), accommodating users with different language preferences (e.g., via an ASL page), and viewing multiple participants (e.g., via a gallery page).

Upon selection, by the developer, of the main page representation 524, the computing device on which the developer is working may be caused to display a main page 530 (shown as "MainPage (Navigation)"). The main page 530 may integrate additional specialized pages to enhance user experience further. These may include a speaker page representation 532 for spotlighting active speakers, a share page representation 534 for content sharing, a present page representation 536 for managing presentations, and an immersive page representation 538 for more engaging meeting environments. Each of these elements is indicative of tailored interfaces addressing specific interactions within a meeting.

Figure 6:
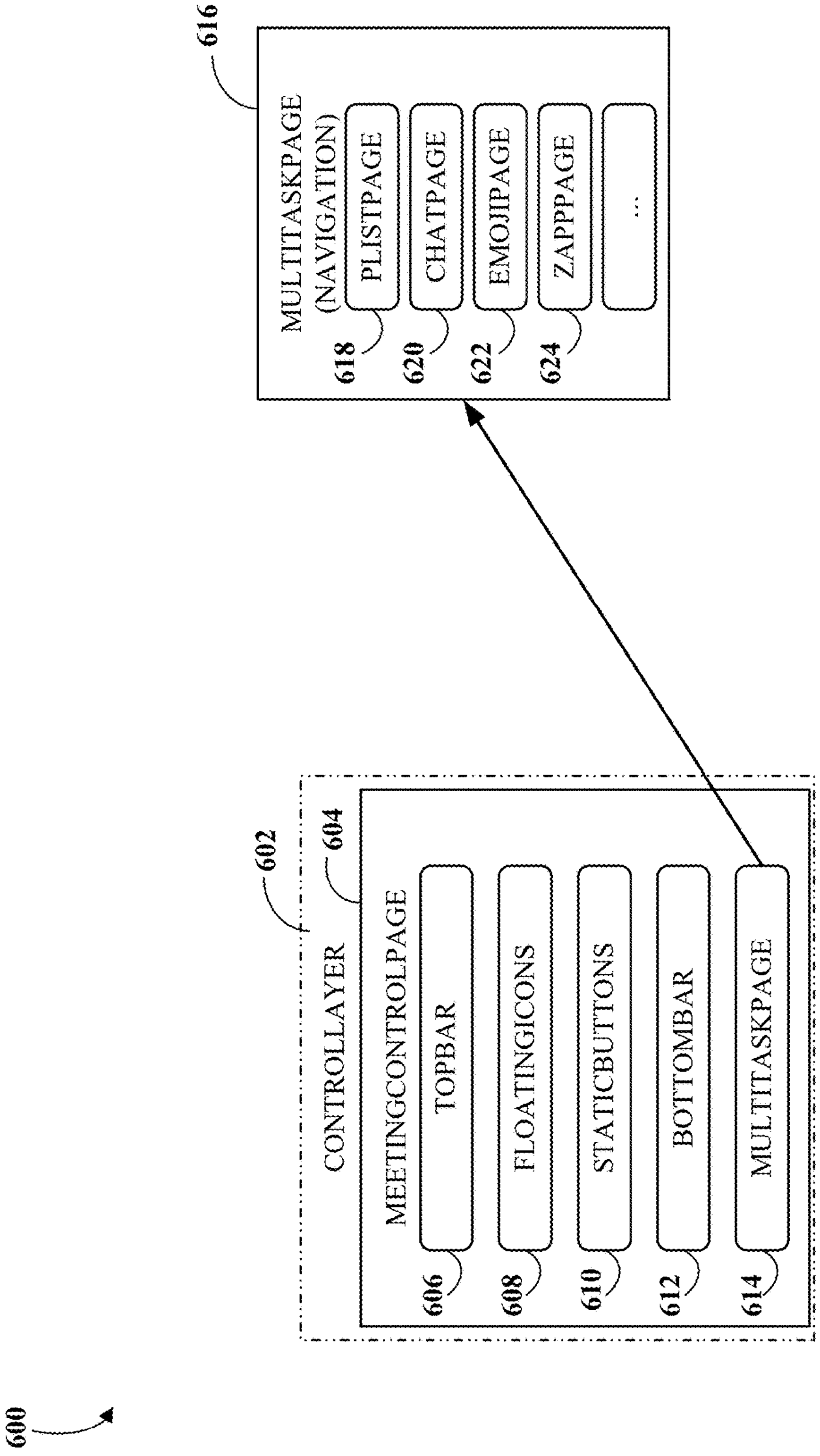
FIG. 6 is a block diagram showing an example architecture of a control layer in a video conferencing application structure.

FIG. 6 is a block diagram showing an example architecture 600 of a control layer 602 in a video conferencing application structure. For example, the video conferencing application structure may be, include, or be included in, the mobile application 400 shown in FIG. 4. The control layer 602 includes a meeting control page 604 (shown as "MeetingControlPage") which is responsible for overall meeting functionalities.

The meeting control page 604 includes a top bar representation 606, which corresponds to an upper section of the conferencing interface, displaying controls and information. Below the top bar representation 606 are floating icons representation 608 and static buttons representation 610, which provide interactive elements for users to engage with various features of the conferencing application. These representations are designed to enhance accessibility and usability within the video conferencing environment.

The control layer 602 also includes a bottom bar representation 612, positioned at the lower section of the interface, offering additional options and settings similar to the top bar. The multitask page representation 614 may be selected to access the multitask page 616. The multitask page 616 serves as the central navigation component for switching between different functionalities within the application.

The multitask page 616 is depicted with several hierarchical navigation options, leading to different pages of the application. These pages include property list page representation 618, chat page representation 620, emoji page representation 622, and a third-party integrations page representation 624 (shown as "ZappPage"). Each of these pages corresponds to distinct features, such as user property management, chat functionalities, emoji interactions, and third-party integrations (Zapp), respectively.

Figure 7:
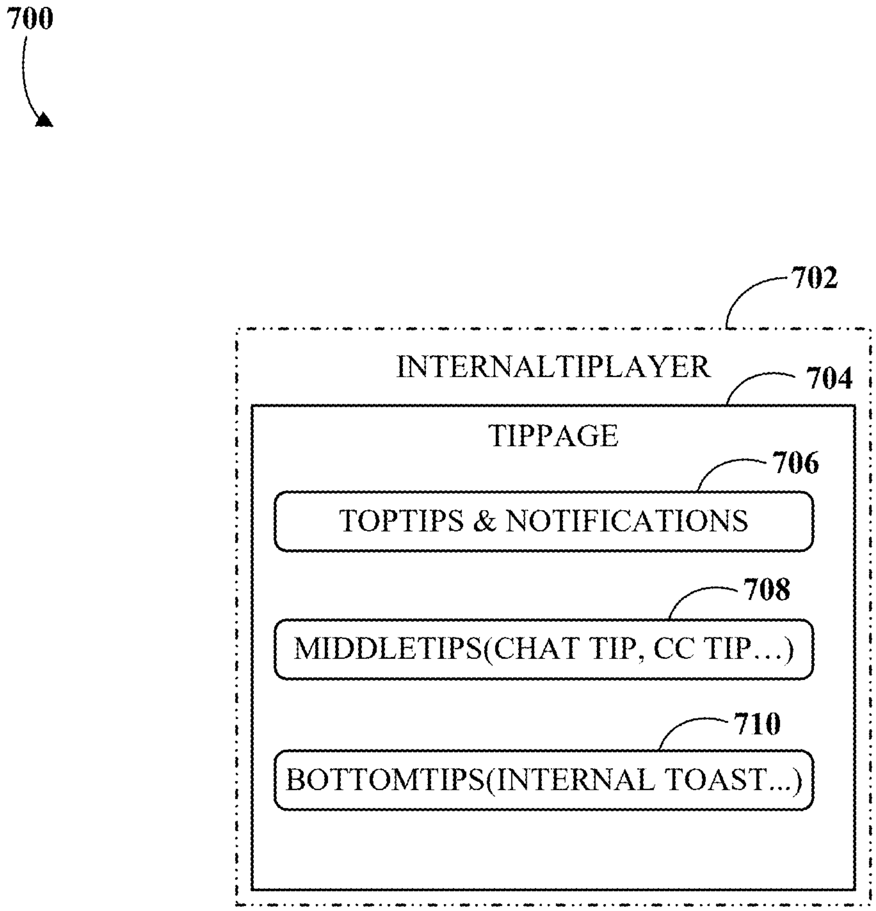
FIG. 7 is a block diagram showing an example architecture of an internal tip layer in a video conferencing application structure.

FIG. 7 is a block diagram showing an example architecture 700 of an internal tip layer 702 in a video conferencing application structure. The internal tip layer includes an internal tip page 703, which acts as a container and organizing unit for various tips and notifications pertinent to the functioning of the mobile application. The internal tip page 703 is segregated into three primary sections to order the tips and notifications for effective user engagement. The top tips and notifications representation 706 occupies the highest section of the internal tip page 703 and is designated for displaying tips and notifications which are intended to catch immediate user attention due to their prominence in the layout. The middle tips representation 708 is positioned centrally on the internal tip page 703 and is intended for displaying tips such as chat tips or other contextually relevant tips (e.g., closed caption tips) that are useful for user communication and interaction within the application but do not require immediate attention compared to the top tips and notifications. The bottom tips representation 710 is located at the lower segment of the tip page 704 and may be used for internal toasts or other transient notifications that provide informative messages or feedback to the user. These are typically less prominent and may not persist for long durations but may serve a role in user communication flow.

Figure 8:
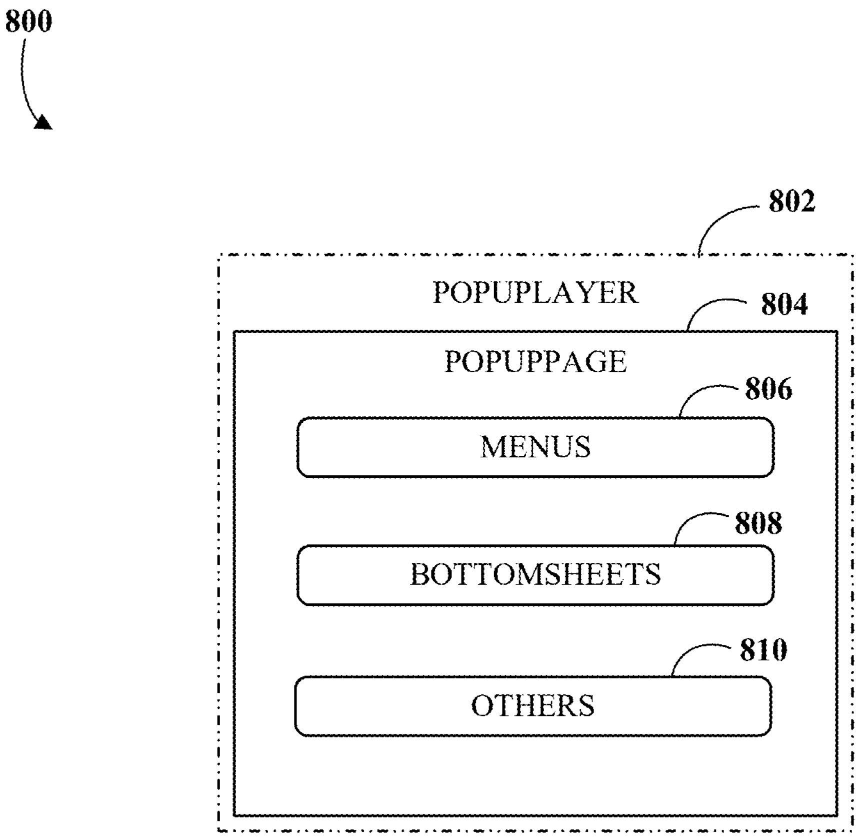
FIG. 8 is a block diagram showing an example architecture of a pop-up layer in a video conferencing application structure.

FIG. 8 is a block diagram showing an example architecture 800 of a pop-up layer 802 (shown as "PopupLayer") in a video conferencing application structure. The pop-up layer 802 includes a pop-up page 804. This pop-up page 804 contains various representations relevant to the user interface. For example, the pop-up page 804 includes a menu representation 806, which facilitates user interaction by offering selectable options related to the conferencing application. The pop-up page 804 includes a bottom sheet representation 808, which allows for additional information or options to be presented at a lower point on the user's screen, enabling an efficient yet unobtrusive user experience. The pop-up page 804 may include any number of other representations 810. These other representations 810 can include various miscellaneous elements, providing additional functionalities or information that enhance the user's interaction with the application.

Figure 9:
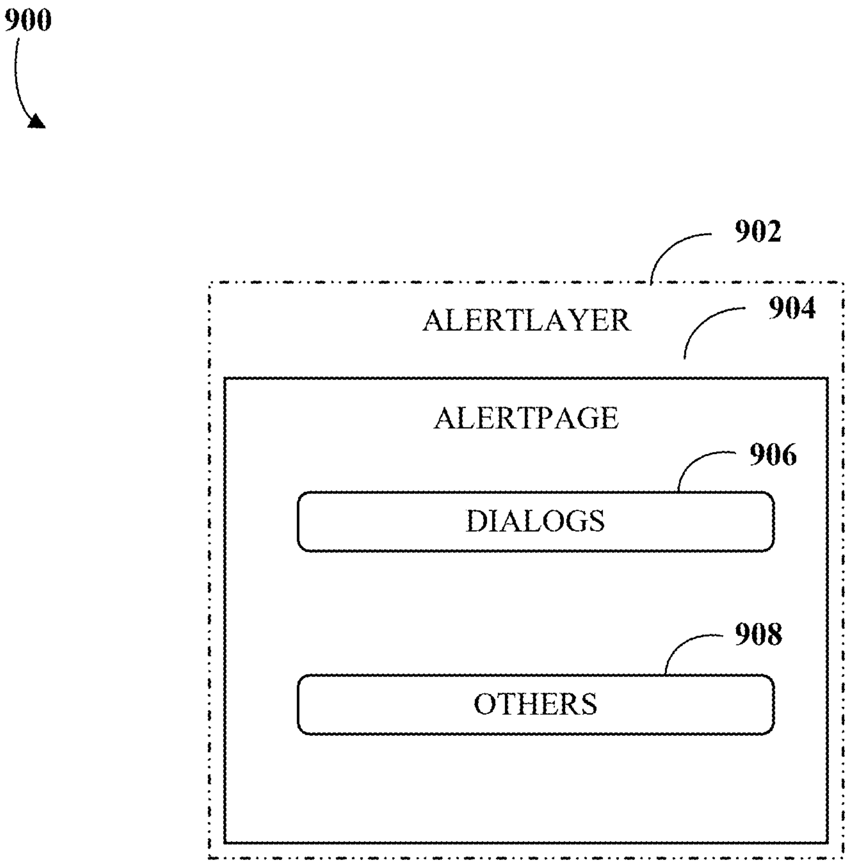
FIG. 9 is a block diagram showing an example architecture of an alert layer in a video conferencing application structure.

FIG. 9 is a block diagram showing an example architecture 900 of an alert layer 902 in a video conferencing application structure. The alert layer 902 may include an alert page 904. The alert layer 902 may facilitate managing alert-related UI elements. The alert page 904 may be configured to display various alert-related dialogs and other representations. As shown, for example, the alert page 904 includes a dialog representation 906, which may facilitate displaying interruptive alert messages requiring immediate user acknowledgement and action. The alert page 904 may include any number of other representations 908, which may correspond to non-dialog elements within the alert layer 902, which can include diverse alert-related notifications that may not necessitate explicit user interaction.

Figure 10:
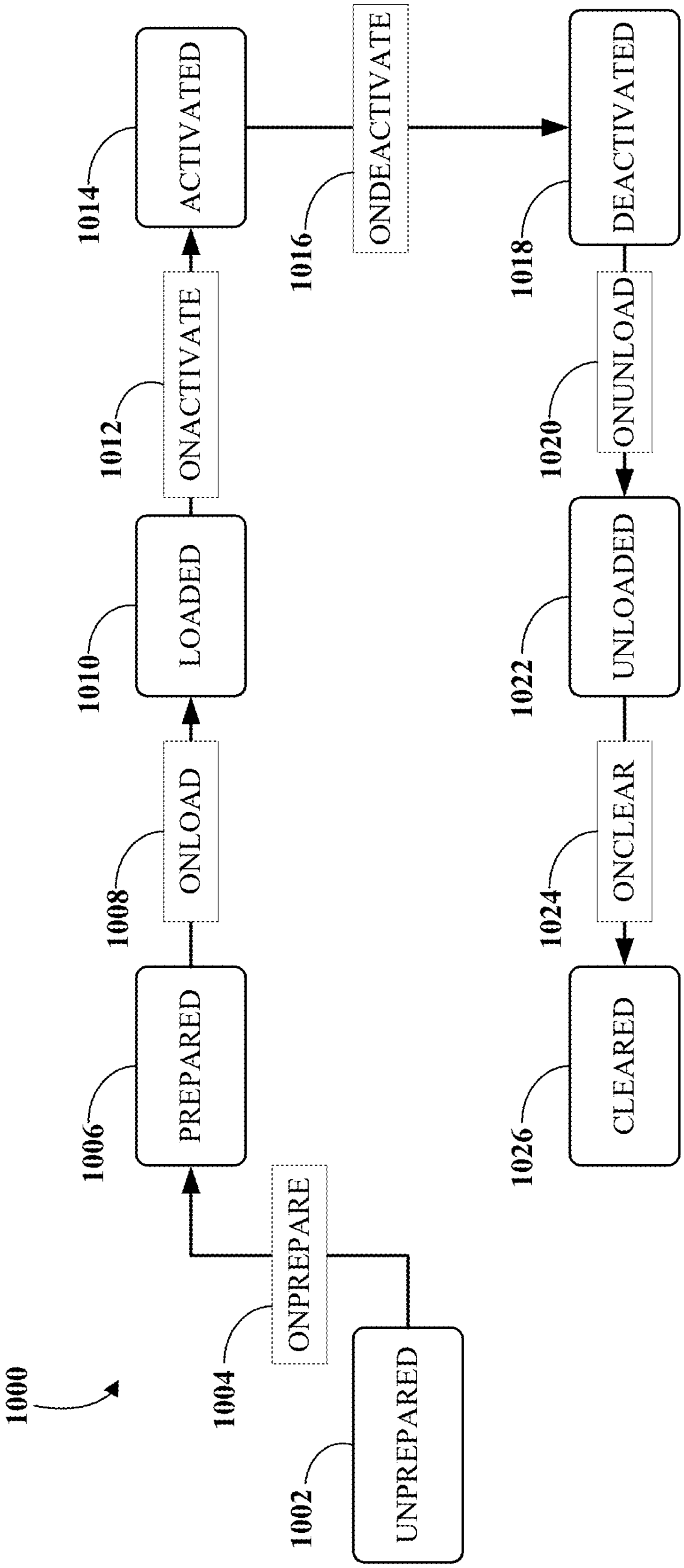
FIG. 10 is a block diagram showing an example state transition diagram illustrating a lifecycle for an application model.

FIG. 10 is a block diagram showing an example state transition diagram illustrating a lifecycle 1000 for an application model. The lifecycle 1000 includes various states and their associated callbacks, demonstrating how an application progresses through different phases of its lifecycle. The initial state is the unprepared state 1002. Upon calling the onPrepare state callback 1004, the application transitions to the prepared state 1006. Following this, the onload state callback 1008 triggers the transition from the prepared state 1006 to the loaded state 1010. Once in the loaded state 1010, invoking the onActivate state callback 1012 advances the application to the activated state 1014. When it is necessary to deactivate the application, the onDeactivate state callback 1016 is called, leading to the deactivated state 1018. Following deactivation, the onUnload state callback 1020 is executed, transitioning the application to the unloaded state 1022. Subsequently, the application can proceed from the unloaded state 1022 to the cleared state 1026 by calling the onClear state callback 1024.

Figure 11:
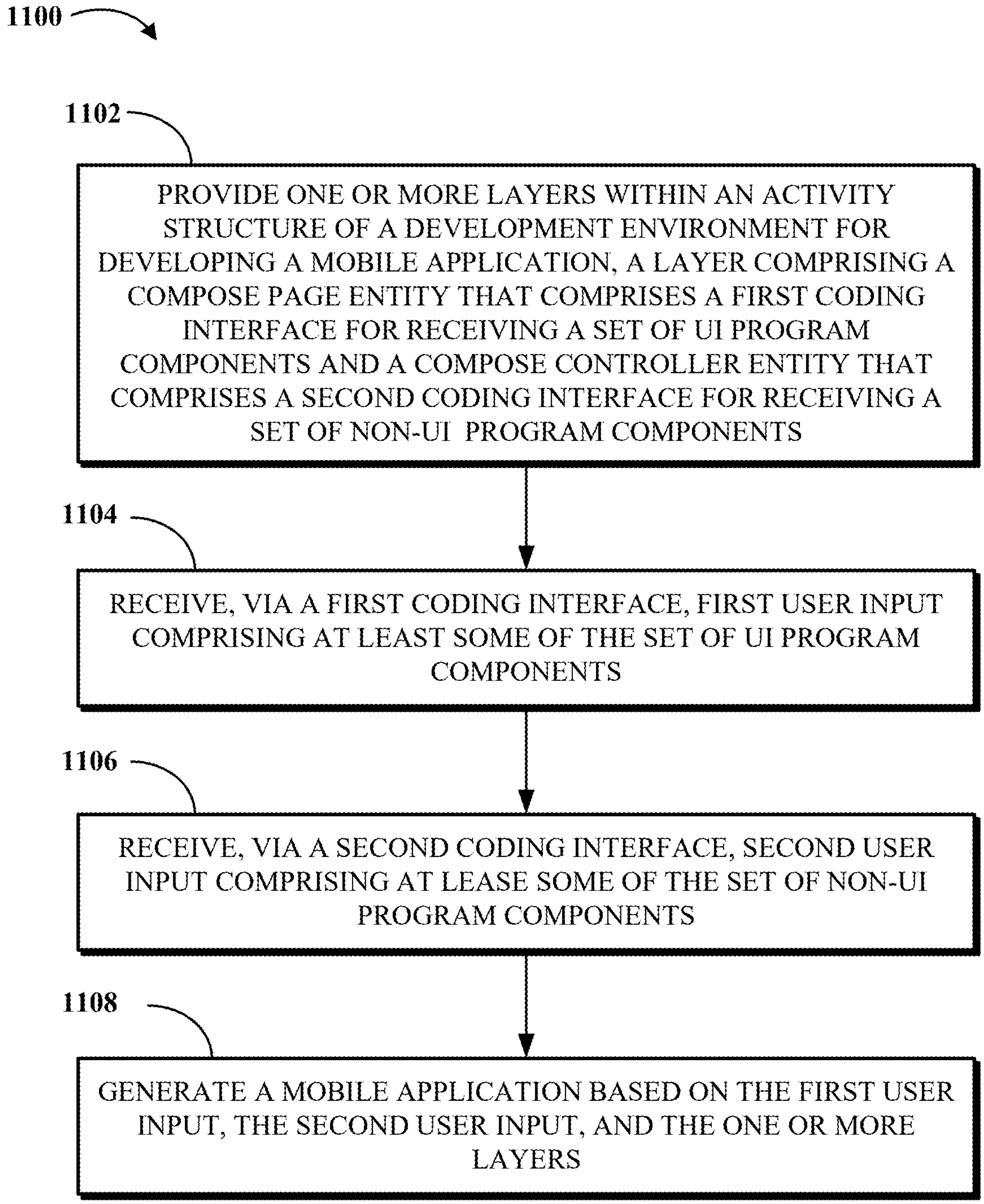
FIG. 11 is a flowchart of an example of a technique for developing a mobile conferencing application.

To further describe some implementations in greater detail, reference is next made to examples of techniques which may be performed by or using a system for developing a mobile conferencing application. FIG. 11 is a flowchart of an example of a technique 1100 for developing a mobile conferencing application. The technique 1100 can be executed using computing devices, such as the systems, hardware, and software described with respect to FIGS. 1-10. The technique 1100 can be performed, for example, by executing a machine-readable program or other computer-executable instructions, such as routines, instructions, programs, or other code. The steps, or operations, of the technique 1100, or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations of the technique 1100 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The step 1102 includes providing one or more layers within an activity structure of a development environment for developing a mobile application, wherein a layer of the one or more layers comprises a compose page entity associated with a UI page of the mobile application and a compose controller entity corresponding to the compose page entity, wherein the compose page entity comprises a first coding interface for receiving a set of UI program components associated with the UI page, and wherein the compose controller entity comprises a second coding interface for receiving a set of non-UI program components associated with the UI page. The layer may include an additional compose page entity associated with an additional UI page of the mobile application and an additional compose controller entity corresponding to the additional compose page entity. The set of UI program components may include one or more function definitions associated with the UI page.

The step 1104 includes receiving, via the first coding interface, first user input comprising at least some of the set of UI program components. The step 1106 includes receiving, via the second coding interface, second user input comprising at least some of the set of non-UI program components. The step 1108 includes generating the mobile application based on the first user input, the second user input, and the one or more layers.

Some implementations include a method, comprising: providing one or more layers within an activity structure of a development environment for developing a mobile application, wherein a layer of the one or more layers comprises a compose page entity associated with a UI page of the mobile application and a compose controller entity corresponding to the compose page entity, wherein the compose page entity comprises a first coding interface for receiving a set of UI program components associated with the UI page, and wherein the compose controller entity comprises a second coding interface for receiving a set of non-UI program components associated with the UI page; receiving, via the first coding interface, first user input comprising at least some of the set of UI program components; receiving, via the second coding interface, second user input comprising at least some of the set of non-UI program components; and generating the mobile application based on the first user input, the second user input, and the one or more layers.

In some implementations, the layer comprises: an additional compose page entity associated with an additional UI page of the mobile application; and an additional compose controller entity corresponding to the additional compose page entity.

In some implementations, the set of UI program components comprises one or more function definitions associated with the UI page.

In some implementations, the compose page entity comprises a controller attribute that maps a user interaction event to the compose controller entity, wherein the set of non-UI program components are configured to modify, based on the user interaction event, a state of the mobile application.

In some implementations, the compose page entity comprises a parent attribute indicative of a parent page of the UI page.

In some implementations, the compose page entity comprises a child attribute indicative of a child page of the UI page.

In some implementations, the compose page entity comprises a child attribute indicative of a plurality of child pages of the UI page.

In some implementations, the compose controller comprises a plurality of state callbacks, wherein the plurality of state callbacks comprises: a first state callback that initializes the UI page; a second state callback that loads data from a data source; a third state callback that activates the UI page; a fourth state callback that deactivates the UI page; a fifth state callback that releases the data; and a sixth state callback that releases resources utilized by the compose controller entity.

In some implementations, the compose controller comprises a display scope configured to execute a set of jobs, wherein a job of the set of jobs comprises a lifecycle identical to a lifecycle associated with displaying the UI page.

In some implementations, the compose controller comprises a logic scope configured to execute a set of jobs, wherein a job of the set of jobs comprises a lifecycle identical to a lifecycle associated with the set of non-UI program components.

In some implementations, the compose controller comprises a logic scope configured to execute a set of jobs, wherein a job of the set of jobs has an activity state independent of a display state of the UI page.

Some implementations include a non-transitory computer-readable medium storing instructions operable to cause one or more processors to perform operations comprising: providing one or more layers within an activity structure of a development environment for developing a mobile application, wherein a layer of the one or more layers comprises a compose page entity associated with a UI page of the mobile application and a compose controller entity corresponding to the compose page entity, wherein the compose page entity comprises a first coding interface for receiving a set of UI program components associated with the UI page, and wherein the compose controller entity comprises a second coding interface for receiving a set of non-UI program components associated with the UI page; receiving, via the first coding interface, first user input comprising at least some of the set of UI program components; receiving, via the second coding interface, second user input comprising at least some of the set of non-UI program components; and generating the mobile application based on the first user input, the second user input, and the one or more layers.

In some implementations, the one or more layers comprises a display layer, the display layer comprises a container that includes a set compose page entities associated with a set of UI pages, including the UI page, corresponding to a set of primary features of the mobile application.

In some implementations, the one or more layers comprises a display layer, the display layer comprising a set of compose page entities associated with a set of UI pages organized according to a parent child hierarchy.

In some implementations, the one or more layers comprises a control layer comprising a container that includes a set of compose page entities associated with a set of control pages corresponding to a set of control features of the mobile application.

In some implementations, the one or more layers comprises an internal tip layer comprising a container that includes a set of compose page entities associated with a set of internal tip pages for providing information about one or more events occurring within the mobile application.

Some implementations include a system, comprising: one or more memories; and one or more processors configured to execute instructions stored in the one or more memories to: provide one or more layers within an activity structure of a development environment for developing a mobile application, wherein a layer of the one or more layers comprises a compose page entity associated with a UI page of the mobile application and a compose controller entity corresponding to the compose page entity, wherein the compose page entity comprises a first coding interface for receiving a set of UI program components associated with the UI page, and wherein the compose controller entity comprises a second coding interface for receiving a set of non-UI program components associated with the UI page; receive, via the first coding interface, first user input comprising at least some of the set of UI program components; receive, via the second coding interface, second user input comprising at least some of the set of non-UI program components; and generate the mobile application based on the first user input, the second user input, and the one or more layers.

In some implementations, the one or more layers comprises an internal tip layer comprising a container that includes a set of compose page entities associated with a set of internal tip pages for providing one or more suggestions for executing a set of actions within the mobile application.

In some implementations, the one or more layers comprises a popup layer comprising a container that includes a set of compose page entities associated with a set of popup pages of the mobile application.

In some implementations, the one or more layers comprises an alert layer comprising a container that includes a set of compose page entities associated with a set of dialog pages for presenting one or more alert messages to a user of the mobile application.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

providing one or more layers within an activity structure of a development environment for developing a mobile application, wherein a layer of the one or more layers comprises a compose page entity associated with a user interface (UI) page of the mobile application and a compose controller entity corresponding to the compose page entity, wherein the compose page entity comprises a controller attribute that references the compose controller entity and a first coding interface for receiving a set of UI program components associated with the UI page, and wherein the compose controller entity comprises a second coding interface for receiving a set of non-UI program components associated with the UI page;

defining, by the compose controller entity, a plurality of state callbacks that manage a lifecycle for the compose controller entity, wherein the plurality of state callbacks includes a first state callback that initializes the UI page prior to data loading, a second state callback that activates the UI page, and a third state callback that releases resources utilized by the UI page;

receiving, via the first coding interface, first user input comprising at least some of the set of UI program components;

receiving, via the second coding interface, second user input comprising at least some of the set of non-UI program components, wherein the at least some of the set of non-UI program components are associated with one or more of the plurality of state callbacks; and generating the mobile application based on the first user input, the second user input, and the one or more layers, wherein the mobile application is configured to invoke the plurality of state callbacks to transition the compose controller entity through a plurality of lifecycle states.

2. The method of claim 1, wherein the layer of the one or more layers comprises:

an additional compose page entity associated with an additional UI page of the mobile application; and an additional compose controller entity corresponding to the additional compose page entity.

3. The method of claim 1, wherein the compose page entity comprises a controller attribute that maps a user interaction event to the compose controller entity, wherein the set of non-UI program components are configured to modify, based on the user interaction event, a state of the mobile application.

4. The method of claim 1, wherein the compose page entity comprises a parent attribute indicative of a parent page of the UI page.

5. The method of claim 1, wherein the compose page entity comprises a child attribute indicative of a child page of the UI page.

6. The method of claim 1, wherein the compose page entity comprises a child attribute indicative of a plurality of child pages of the UI page.

7. The method of claim 1, wherein the compose controller entity comprises a plurality of state callbacks, wherein the plurality of state callbacks comprises: a fourth state callback that loads data from a data source; a fifth state callback that deactivates the UI page; and a sixth state callback that releases the data.

8. The method of claim 1, wherein the compose controller entity comprises a display scope configured to execute a set of jobs, wherein a job of the set of jobs comprises a lifecycle identical to a lifecycle associated with displaying the UI page.

9. The method of claim 1, wherein the compose controller entity comprises a logic scope configured to execute a set of jobs, wherein a job of the set of jobs comprises a lifecycle identical to a lifecycle associated with the set of non-UI program components.

10. The method of claim 1, wherein the compose controller entity comprises a logic scope configured to execute a set of jobs, wherein a job of the set of jobs has an activity state independent of a display state of the UI page.

11. A non-transitory computer-readable medium storing instructions operable to cause one or more processors to perform operations comprising:

providing one or more layers within an activity structure of a development environment for developing a mobile application, wherein a layer of the one or more layers comprises a compose page entity associated with a user interface (UI) page of the mobile application and a compose controller entity corresponding to the compose page entity, wherein the compose page entity comprises a controller attribute that references the compose controller entity and a first coding interface for receiving a set of UI program components associated with the UI page, and wherein the compose controller entity comprises a second coding interface for receiving a set of non-UI program components associated with the UI page;

defining, by the compose controller entity, a plurality of state callbacks that manage a lifecycle for the compose controller entity, wherein the plurality of state callbacks includes a first state callback that initializes the UI page prior to data loading, a second state callback that activates the UI page, and a third state callback that releases resources utilized by the UI page;

receiving, via the first coding interface, first user input comprising at least some of the set of UI program components;

receiving, via the second coding interface, second user input comprising at least some of the set of non-UI program components, wherein the at least some of the set of non-UI program components are associated with one or more of the plurality of state callbacks; and generating the mobile application based on the first user input, the second user input, and the one or more layers, wherein the mobile application is configured to invoke the plurality of state callbacks to transition the compose controller entity through a plurality of lifecycle states.

12. The non-transitory computer-readable medium of claim 11, wherein the set of UI program components comprises one or more function definitions associated with the UI page.

13. The non-transitory computer-readable medium of claim 11, wherein the one or more layers comprises a display layer, the display layer comprises a container that includes a set compose page entities associated with a set of UI pages, including the UI page, corresponding to a set of primary features of the mobile application.

14. The non-transitory computer-readable medium of claim 11, wherein the one or more layers comprises a display layer, the display layer comprising a set of compose page entities associated with a set of UI pages organized according to a parent child hierarchy.

15. The non-transitory computer-readable medium of claim 11, wherein the one or more layers comprises a control layer comprising a container that includes a set of compose page entities associated with a set of control pages corresponding to a set of control features of the mobile application.

16. The non-transitory computer-readable medium of claim 11, wherein the one or more layers comprises an internal tip layer comprising a container that includes a set of compose page entities associated with a set of internal tip pages for providing information about one or more events occurring within the mobile application.

17. A system, comprising:

one or more memories; and one or more processors configured to execute instructions stored in the one or more memories to:

provide one or more layers within an activity structure of a development environment for developing a mobile application, wherein a layer of the one or more layers comprises a compose page entity associated with a user interface (UI) page of the mobile application and a compose controller entity corresponding to the compose page entity, wherein the compose page entity comprises a controller attribute that references the compose controller entity and a first coding interface for receiving a set of UI program components associated with the UI page, and wherein the compose controller entity comprises a second coding interface for receiving a set of non-UI program components associated with the UI page;

define, by the compose controller entity, a plurality of state callbacks that manage a lifecycle for the compose controller entity, wherein the plurality of state callbacks includes a first state callback that initializes the UI page prior to data loading, a second state callback that activates the UI page, and a third state callback that releases resources utilized by the UI page;

receive, via the first coding interface, first user input comprising at least some of the set of UI program components;

receive, via the second coding interface, second user input comprising at least some of the set of non-UI program components, wherein the at least some of the set of non-UI program components are associated with one or more of the plurality of state callbacks; and generate the mobile application based on the first user input, the second user input, and the one or more layers, wherein the mobile application is configured to invoke the plurality of state callbacks to transition the compose controller entity through a plurality of lifecycle states.

18. The system of claim 17, wherein the one or more layers comprises an internal tip layer comprising a container that includes a set of compose page entities associated with a set of internal tip pages for providing one or more suggestions for executing a set of actions within the mobile application.

19. The system of claim 17, wherein the one or more layers comprises a popup layer comprising a container that includes a set of compose page entities associated with a set of popup pages of the mobile application.

20. The system of claim 17, wherein the one or more layers comprises an alert layer comprising a container that includes a set of compose page entities associated with a set of dialog pages for presenting one or more alert messages to a user of the mobile application.

* * * * *